United States Patent [19]

Chandler

[11] Patent Number: 5,108,127
[45] Date of Patent: Apr. 28, 1992

[54] VEHICLE SUSPENSION SYSTEM

[76] Inventor: Robert B. Chandler, 21 Brookwood, Town & Country, Mo. 63131

[21] Appl. No.: 550,296

[22] Filed: Jul. 9, 1990

[51] Int. Cl.$^5$ .............................................. B60G 15/00
[52] U.S. Cl. ..................................... 280/675; 280/690; 280/701
[58] Field of Search ................ 180/233; 280/675, 688, 280/690, 701

[56] References Cited

U.S. PATENT DOCUMENTS

| | | | |
|---|---|---|---|
| 3,868,129 | 2/1975 | Grosseau | 280/690 |
| 3,876,029 | 4/1975 | von der Ohe | 280/690 |
| 4,545,602 | 10/1985 | Shibahata | 280/675 |
| 4,566,717 | 1/1986 | Arthur et al. | 280/701 |
| 4,807,902 | 2/1989 | Girodin | 280/701 |
| 4,881,752 | 11/1989 | Tanaka | 280/675 |

FOREIGN PATENT DOCUMENTS 2822058  11/1979  Fed. Rep. of Germany ...... 280/690

*Primary Examiner*—Kenneth R. Rice
*Assistant Examiner*—Tamara L. Finlay
*Attorney, Agent, or Firm*—Polster, Lieder, Woodruff & Lucchesi

[57] ABSTRACT

A vehicle controllable and smooth ride system with sprung weight comparable to or less than the unsprung weight is provided by a cantilevered connection between the front and rear unsprung weight and near horizontal arrangement of suspension devices in the sprung weight of the vehicle so verticle motion of the front and rear unsprung weight is transmitted to the sprung weight while the entire sprung weight is applied to each front and rear unsprung weight motions.

12 Claims, 2 Drawing Sheets

VEHICLE SUSPENSION SYSTEM

BACKGROUND OF THE INVENTION

1. Field of the Invention

This invention is directed to a suspension system for vehicles having comparable or heavier unsprung weight than sprung weight, wherein the vertical motion of the front and rear unsprung weight is transmitted to the sprung weight while the sprung weight is applied to both front and rear unsprung weight motion.

2. Description of the Prior Art

It is almost universally known in vehicle suspension systems that the sprung weight of a vehicle is always much heavier than the unsprung weight in order to curb the violent vertical pitching of the sprung weight relative to the lighter unsprung weight. The normal terminology in speaking of sprung and unsprung weight is to assign to unsprung weight the total of tires, wheels, axles and the spring means supported by the tires (hereinafter called tires), and to assign to the sprung weight the term body such as the engine, transmission, frame, any cargo and all people in the body (hereinafter called body).

To have a controllable and smooth riding vehicle, the body has to be considerably heavier than the tires, and there must be some suspension components connected between the body and the tires. An example of current weight distribution with the body being heavier than the tire is well understood. When such a vehicle hits a bump or obstacle the tires move upward compressing the suspension components or shocks, and energy is created. The suspension components want to return the tires so as to recover its normal shape and the energy will thus be dissipated through the lighter of the objects containing it which is to push the lighter tires down to the road.

When a vehicle does not have enough body weight to control the tire weight, a rough ride for the occupant will occur and poor vehicle control will result. For example, as the tires move upward some of the energy will be discharged through the lighter body then the remaining compressed energy will give the body an extra jolt.

If a vehicle has more tire weight than body weight there is an almost hopeless suspension problem. What happens is the tire weight controls the body weight instead of the normal situation where the body weight controls the tires. The problem is overcome in a suspension system for vehicles having comparable or heavier tire weight than body weight, although the system is not to be limited in that way, by the vertical motion of the front and rear tires being transmitted to the body while the body weight is substantially all applied to both the front and rear tire motion.

BRIEF DESCRIPTION OF THE INVENTION

There is a distinct problem with vehicle suspensions when the weight of the vehicle tires is equal to or greater than the body weight, as pointed out above when the heavier tires control the vertical motion response of the lighter body.

An important object of the invention is to employ cantilever means for energy transfer between the tires and body so that the cantilever means transfers the body weight of the entire vehicle to resist the motion of the front and rear tires, instead of utilizing just part of the body weight to control each tire.

A further object of the invention is to arrive at a workable vehicle in which the tires are heavier than the body by locating the energy transfer components above a system of cantilever means operating between the tires and body and to direct the thrust reaction of the energy components to a near horizontal plane.

A still further object of the invention is to be able to apply the entire body weight to the motion of either the front or rear tires so that the body weight is heavier than the weight of either front or rear tires. Other objects of the invention are achieved by an improved direction of reaction of energy transfer means, such as gas shocks, or an air shock, and it can also be achieved with the use of leaf or coil springs, air bags or coil-over shocks.

BRIEF DESCRIPTION OF THE DRAWINGS

The invention is disclosed in a preferred embodiment in the following drawing views, as follows.

DETAILED DESCRIPTION OF THE EMBODIMENTS

Figure 1:
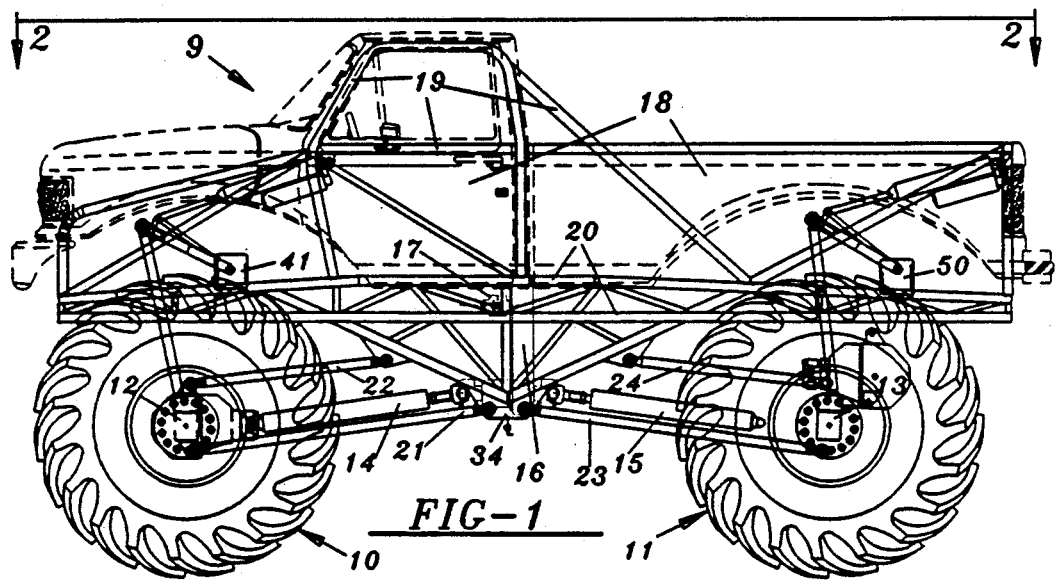
FIG. 1 is a side elevation of a vehicle assembly having a frame and body mounted on the front and rear wheels, tires and axle in a four wheel drive arrangement.

The vehicle 9 of FIG. 1 is currently recognized as a Bigfoot 4×4 having the suspension assembly above referred to in which there are large front tires 10, large nonsteerable rear tires 11, a front drive axle 12, a rear drive axle 13, torque drive shafts 14 and 15 suitably geared into a transfer case 16. The upper end of the case 16 is fitted with a transmission drive fitting 17. The transmission and engine assemblies are not shown to better disclose the important construction of the vehicle 9.

The vehicle 9 has a body shell 18 fitted over a roll cage 19 that is an integrated unit in which the major component is a main frame 20. In this view of FIG. 1, the unsprung weight is attributed to the large tires 10 and 11, the drive axles 12 and 13, the drive shafts 14 and 15, and certain axle alignment rods seen at 21 and 22 at the front axle 12, and similar rods 23 and 24 for the rear axle 13.

Figure 2:
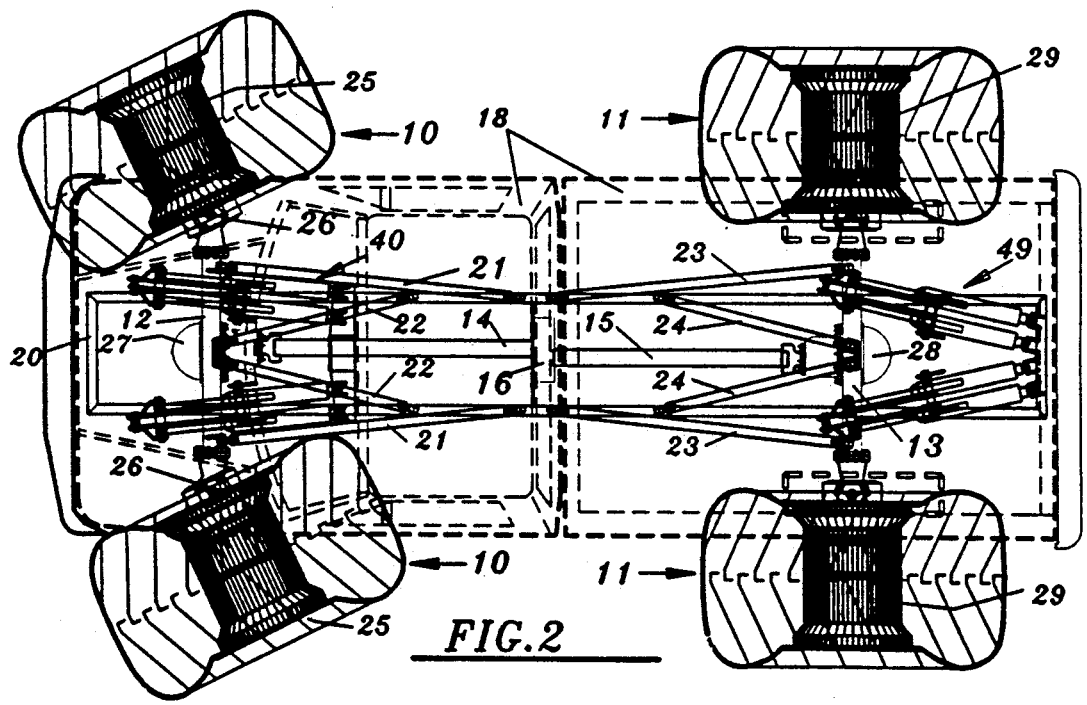
FIG. 2 is a plan view of the vehicle of FIG. 1 taken along the line 2—2 in FIG. 1, with the body outlined in a schematic rendering.

FIG. 2 is a plan view seen along line 2—2 in FIG. 1, with the sprung body 18 shown only in fragmentary outline so as not to obscure the components making up the unsprung weight. Thus the front steerable tires 10 have enlarged rims 25 and steerable knuckle means 26. The drive axle 12 has the differential housing 27. The before noted longitudinal main frame 20 furnishes the structure for connecting the front axle alignment rods 21 and 22 which extend from the main frame 20 (See FIG. 3) to the axle 12. The main frame 20 also furnishes the structure for connecting the rear axle alignment rods 23 and 24 which extend to the rear axle 13. The rear axle has the usual differential housing 28. The rear axle is connected to wheel rims 29 for the rear tires 11.

FIG. 2 has disclosed the transfer case 16 which houses a suitable gear train to deliver power to the drive shafts 14 and 15 (See FIG. 1). The engine and transmission are not shown, but with the transfer case 16 are parts of the body weight, as will appear presently.

Figure 3:
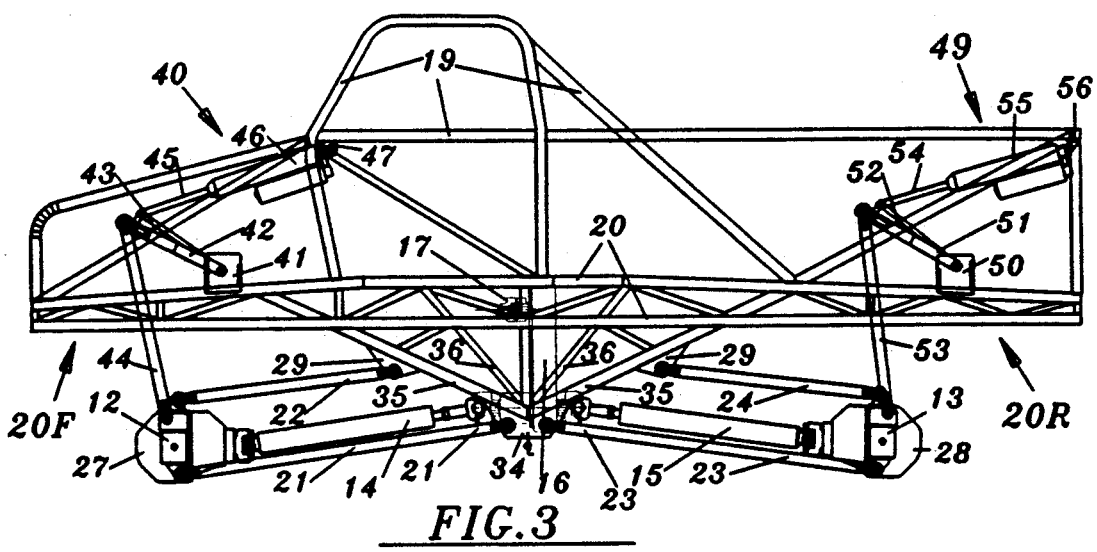
FIG. 3 is a side elevation of the construction of a full length main frame together with the suspension system for the axles.

A feature of the invention is seen in FIG. 3 which includes the integrated roll cage 19 or superstructure which with the main frame 20 is a principal part extending from front to rear. The main frame 20 is centrally braced by a substructure including struts 35 extending from a focal bracket 34 angularly upward and forward and rearward to join in the main frame 20. Other struts 36 make up the further substructure supporting the bracket 34 from the main frame 20. The struts 35 support brackets 29 to which the previously described alignment rods 22 and 24 are connected, while the alignment rods 21 and 23 are connected to bracket 34.

Figure 4:
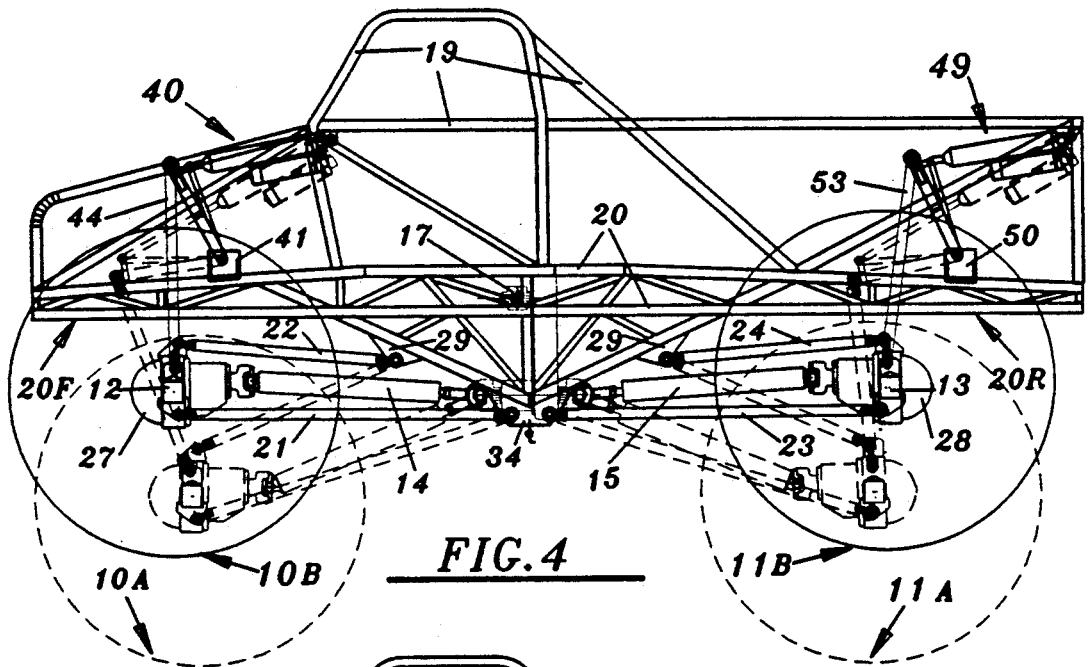
FIG. 4 is a side elevational view of the frame and suspension system illustrating the range of motion of the wheels, tires, axles, cantilevers and gas shocks.

FIG. 4 is a side view of the system for operatively connecting the axles 12 and 13 to the main frame 20. This drawing shows the suspension compressed in solid lines and extended with dot-dash lines. It is clearly shown that the entire body weight of main frame 20 and any and all components placed thereon is supported upon both axles 12 and 13. Also, both axles 12 and 13 are restrained from spreading apart to increase the wheel span by alignment rods 21 and 23 anchored at the focal bracket 34. Furthermore, the axles 12 and 13 are retained in operative positions by rods 22 and 24 so the torque drive shafts 14 and 15 are properly kept in operative positions. To make the sprung body weight and unsprung tire weight work together, the energy transfer components in the suspension means is placed above the cantilevered front and rear end portions 20F and 20R respectively of the main frame 20.

It is pointed out that the side elevation views of FIGS. 1, 3, 4 and 5 show only the near side components, as the opposite side components are obscured. FIG. 2, therefore, shows both side components so that when describing the side elevational views, a complete system of components is intended to be included. As one example, the shocks 46 are mounted in pairs at each cantilever 42, 43, and shocks 55 are also mounted in pairs at each cantilever 51, 52. The suspension does not require two shocks per cantilever or any combinations of shocks. Furthermore, the lateral stability of the axle 12 is maintained by the angular position of rods 21, 22 and the axle 13 is also maintained laterally stable by the angular relations of the rods 23, 24.

Looking at FIG. 3, the front suspension assembly 40 comprises an anchor bracket 41 fixed to the adjacent front frame portion 20F, a cantilever means 42 is pivoted at one end on bracket 41 and a secondary cantilever means 43 is carried by the cantilever means 42. The outer end of the cantilever 42 is pivotally connected to a motion transfer strut 44 extending from a pivot connection on axle 12. The outer end of the secondary cantilever means 43 is connected to the piston rod 45 of a gas shock absorber unit 46 having its base end 47 fixed to a structural part of the roll cage 19.

The rear suspension assembly 49 is similar to the front assembly in that there is a fixed bracket 50 on the rear portion 20R of the main frame 20 to pivotally support one end of a primary cantilever means 51 and also a secondary cantilever means 52 fixed to the primary cantilever means 51. The outer end of the primary cantilever means 51 is pivotally connected to a motion transfer strut 53 the lower end of which is pivotally connected to the axle part 13. The secondary cantilever means 52 is pivotally connected to the piston rod 54 of a gas shock absorber unit 55. That gas shock absorber unit 55 has its base end 56 connected to the adjacent portion of the roll cage 19 which is an integral part of the main frame 20.

The just described suspension assemblies 40 and 49 are angularly positioned at a near horizontal angle relative to the motion transfer struts 44 and 53. Furthermore, the total static body weight of the vehicle as defined above is heavier than the static tire weight of either of the front or rear tires 10 or 11. However, as pointed out before, the total static weight of the front and rear tires is heavier than the static body weight. Static weight is a common term of art meaning the weight at rest. When the front tires 10 react to a bump and move vertically, the motion transfer struts 44 at the front of the body cause the cantilever means 42 to swing about the anchor bracket 41 in an arc that is greater than the arc followed by the secondary cantilever means 43. This relative difference in arcuate displacement reduces the stroke or linear motion of the piston rod 45 in the gas shock absorber 46. The resulting push exerted by the front gas shock absorber 46 in the front suspension assembly 40 is transmitted into the frame 20 through roll cage 19 with the result that the reaction to the front shock absorber 46 is that the entire weight of the body is caused to resist the vertical motion that has caused the shock 46 to push on the body thus making substantially all of the weight of the body available to oppose the vertical motion of the front tire. Since the combined front and rear tire system is about 60% of the total vehicle weight, the body weight is more than the weight of either of the front or rear tire systems.

When the same bump that the front tires 10 have passed over is confronted by the rear tires 11, the same reaction of the rear suspension assembly 49 takes place. The result is that the body weight is made to be heavier than the rear tire 11. The overall reaction is that the suspension systems 40 or 49 act to apply the body weight to whichever wheel is displaced.

Figure 5:
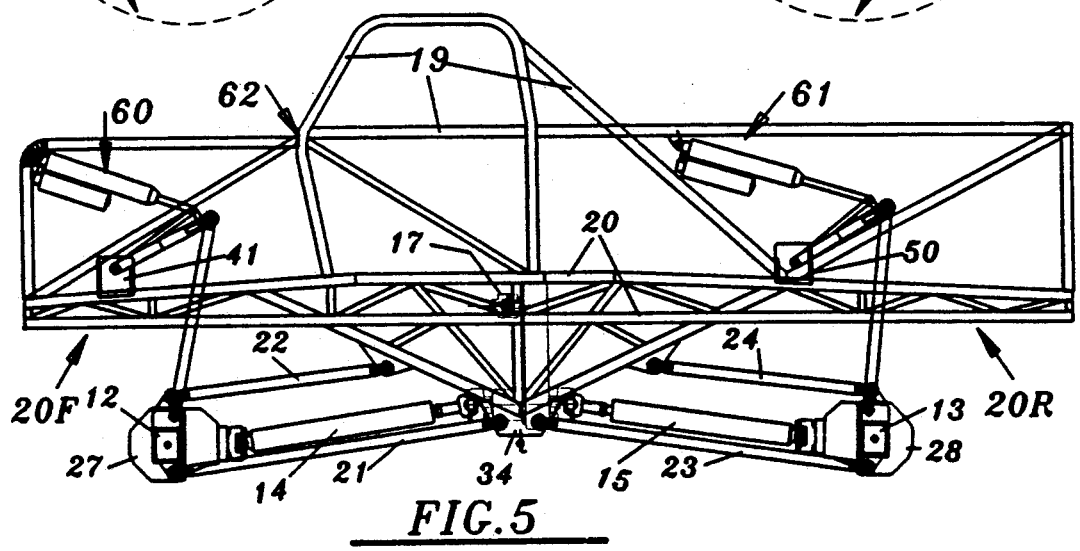
FIG. 5 is a side view of the frame and suspension system of another embodiment.
Figure 1:
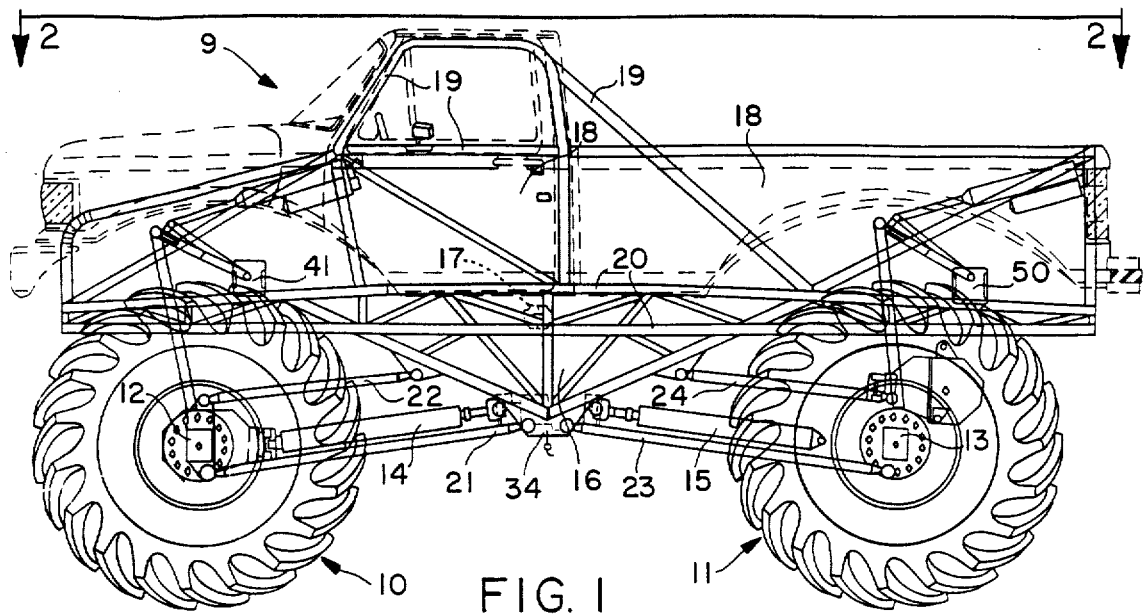
Figure 2:
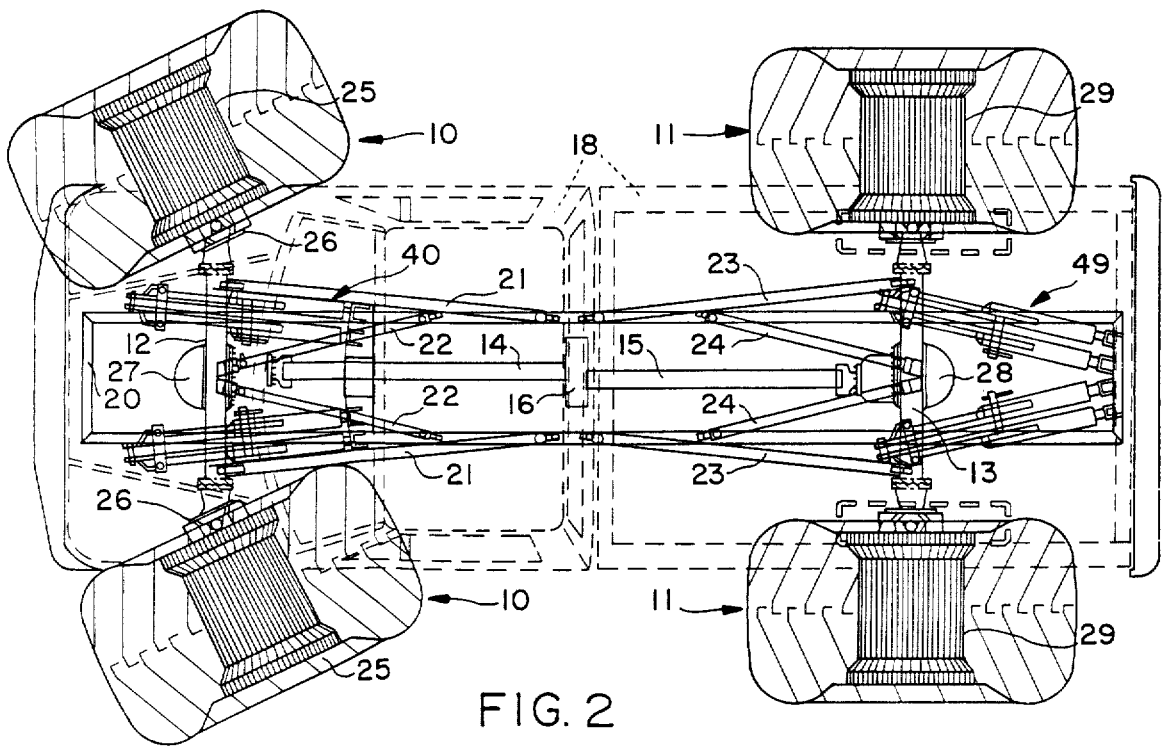

The embodiment seen in FIG. 5 differs from the one seen in FIG. 3 in that the suspension means 60 and 61 are now angularly directed oppositely to those seen in FIG. 3. The operational effect of the FIG. 5 embodiment is substantially like that of the first embodiment. It is noted that the body 62 has a modified frame structure to accommodate the change in the near horizontal position of the suspension means 60 and 61. That change alters the way the body 62 responds. While FIG. 5 discloses a different embodiment for the arrangement of suspension means, it is understood that other combinations can be employed. However, in any arrangement of FIGS. 3 and 5, the tires are opposed by the reactions of the suspension means 61 or 60 as the vehicle encounters an obstruction.

The view of FIG. 4 is intended to illustrate the travel of the tires 10 and 11 from the dotted line down positions 10A and 11A to the elevated or raised full line positions 10B and 11B. There is, however, a slight change in the wheelbase dimension of the axles 12 and 13.

It should now be recognized that this vehicle having total tire weight greater than the total body weight, there results a controllable suspension system in which body weight can be made to impose a greater weight upon either of the front or the rear tires upon a change in the vertical position of the front or rear tires. In other words by employing vertical motion transfer struts 44 and 53 to actuate cantilever means associated with generally horizontal suspension units 40 and 49 in response to change of positions encountered by the tire assemblies 10 and 11, the body weight can be made relatively heavier than the tire weight so that a more normal ride is produced.

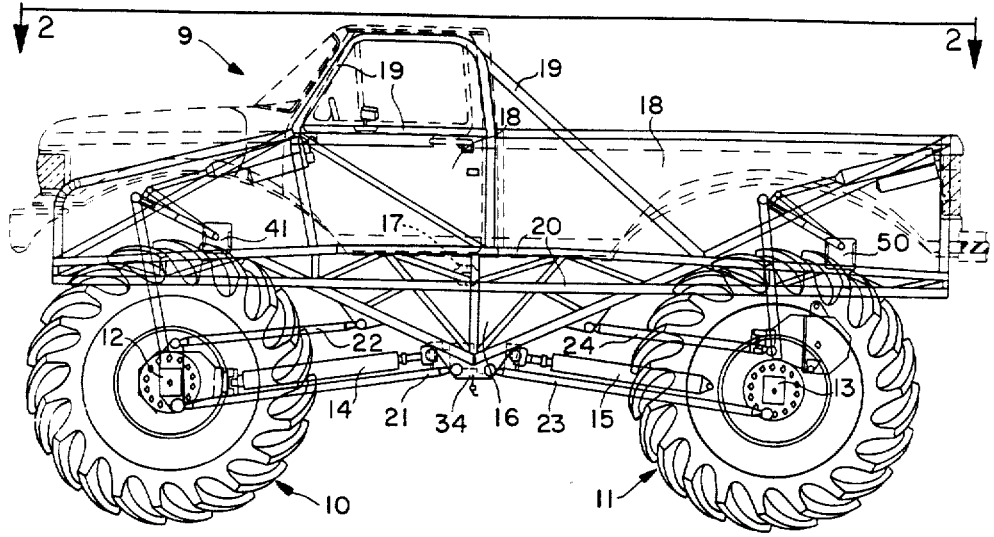

What is claimed is:

1. In a vehicle having a body system and independent front and rear tire systems in which the weight of the combined front and rear tire systems is heavier than the entire weight of the body system, the improvement of:
   (a) axle components in each of the front and rear tire systems;
   (b) longitudinal frame and cage components in the body system;
   (c) separate energy transfer means operative between said body system and each of the axle components in said front and rear tire systems, said separate energy transfer means being operative in response to an individual vertical motion of either of the front and rear tire systems for initiating a response from said body system to apply the weight of said body system to oppose the individual vertical motion of said front and rear tire systems.

2. The improvement set forth in claim 1 wherein said front and rear tire systems have a combined static weight greater than a static weight of said body system.

3. The improvement set forth in claim 1 wherein the weight of said front and rear tire systems make up about sixty percent of the total vehicle weight.

4. The improvement set forth in claim 1 wherein said separate energy transfer means for each of said front and rear tire systems includes force applying means acting in a near horizontal direction on said body system.

5. The improvement set forth in cl aim 1 wherein vertical motion imparted to a front tire system initiates response of said related separate energy transfer means for applying the entire weight of said body system and the rear tire system to oppose said front tire system vertical motion.

6. The improvement set forth in claim 1 wherein vertical motion imparted to a rear tire system initiates response of said related separate energy transfer means for applying the entire weight of said body system and the front tire system to oppose said rear tire system vertical motion.

7. A wheeled vehicle having in combination:
   (a) a main frame structure extending front to rear of the vehicle and struts in said frame for stiffening said frame;
   (b) front and rear tires operatively connected to said stiffening struts in said frame;
   (c) front and rear tire suspension assemblies mounted on the vehicle, each in position elevated above its respective said front and rear tires;
   (d) primary and secondary cantilever means pivotally carried by said frame, adjacent each of said suspension assemblies;
   (e) vertically directed motion transmitting struts connected between said front tires and said primary cantilever means carried by said frame above said front tires, and between said rear tires and said primary cantilever means above said rear tires;
   (f) means connecting said front end rear tire suspension assemblies to said related secondary cantilever means; and
   (g) said primary and secondary cantilever means establishing motion in said front and rear tire suspension assemblies from said motion transmitting struts.

8. A wheeled vehicle having in combination:
   (a) a frame means having front and rear end portions and a substructure depending from said frame means and converging on a primary focal bracket;
   (b) a superstructure on top of said frame means;
   (c) a front tire positioned under said front end portion of said frame means and having position control means connected to said substructure and to said primary focal bracket;
   (d) a rear tire positioned under said rear end portion of said frame means and having position control means connected to said substructure and to said primary focal bracket;
   (e) motion transmitting strut means projecting from each of said front and rear tires into said superstructure above said front and rear end portions respectively of said main frame; and
   (f) a pair of suspension means in said superstructure positioned in near horizontal attitudes, one of said suspension means being operatively connected to said front tire motion transmitting strut means, and the other of said suspension means being operatively connected to said rear tire motion transmitting means.

9. Apparatus for controlling a ride of a vehicle having more unsprung weight than sprung weight comprising:
   (a) a body structure having a longitudinal main frame formed with forward and rear portions;
   (b) body supporting tire suspension assemblies operatively connected to and positioned by said longitudinal main frame respectively adjacent to said forward and rear portions to support said body;
   (c) a cantilever system operatively mounted in each of said forward and rear portions of said frame;
   (d) motion transfer means operatively connected to each of said tire suspension assemblies and to said cantilever systems for effecting operation of said cantilever systems to transfer vertically directed motion response of one of said tire assemblies into said body structure; and
   (e) gas suspension means operatively positioned in said body structure to lie in a substantially horizontal position and being connected to said cantilever systems in said forward and rear portions of said frame and to said body structure, said gas suspension means being responsive to said vertically directed motion from said motion transfer means for applying the weight of said body structure to oppose the individual occurring motions of said tire assemblies.

10. Apparatus for controlling a ride suspension between a body that is lighter than the total weight of the supporting tires, said apparatus comprising:
   (a) a body structure having forward and rear ends;
   (b) body supporting tire suspension assemblies positioned adjacent said forward and rear ends of said body structure;
   (c) tire assembly position control means connected into said body structure for permitting vertical motion of said tires relative to said body structure;

(d) cantilever means mounted in said body structure adjacent each of said tire suspension assemblies, said cantilever means having a pivotal connection with said body structure for movement in an arcuate path;

(e) vertical motion transfer means operatively connected from said tire suspension assemblies to said cantilever means for causing arcuate movement thereof; and (f) body suspensions supporting means mounted in said body structure and operatively connected to said cantilever means, said body suspension supporting means being adapted to respond to a vertically directed motion of said vertical motion transfer means for directing suspension forces in said body structure at an angle to said motion transfer means.

11. A ride control system for a vehicle having front and rear tire suspension assemblies in which the front and rear tire assemblies together are heavier than a body assembly, said rid control system comprising:

(a) a frame structure in the body;

(b) axle means in each of said tire assemblies;

(c) axle position means connected between each of said axle means and said frame structure for permitting vertical translation of each of said axle means independently of each other;

(d) cantilever means carried by said frame structure vertically adjacent each of said axle means;

(e) motion transfer struts connected between said axle means and said cantilever means for responding to axle motion due to front and rear tire assembly ground travel; and (f) ride control energy transfer means in said frame structure operatively connected to said motion transfer struts, said energy transfer means being positioned on said frame structure above said motion transfer struts and having directions of operative response to vertical translation of each of said axle means for causing said frame structure to bodily resist vertical translation of each of said axle means due to tire assembly ground travel.

12. In a ride control system for a vehicle having a total front and rear tire assembly weight greater than the total body assembly weight, the improvement comprising:

(a) a front suspension system connecting the front tire assembly to the body assembly including a front motion transfer means operably connecting the front tire assembly into the body assembly; and (b) a rear suspension system connecting the rear tire assembly to the body assembly including a rear motion transfer means operably connecting the rear tire assembly into the body assembly, said rear motion transfer means occupying a position in the rear suspension system to apply the total body assembly weight in opposition to the rear motion transfer means in response to changes of position encountered by the rear tire assembly.

* * * * *

UNITED STATES PATENT AND TRADEMARK OFFICE
CERTIFICATE OF CORRECTION

PATENT NO. : 5,108,127

DATED : April 28, 1992

INVENTOR(S) : Robert B. Chandler

It is certified that error appears in the above-identified patent and that said Letters Patent is hereby corrected as shown below:

The title page should be deleted, to appear as per attached title page.

The Sheet of drawing, consisting of Figures 1 and 2, should be deleted to appear as per attached sheet.

Signed and Sealed this

Twenty-ninth Day of June, 1993

Attest:

MICHAEL K. KIRK

*Attesting Officer*   Acting Commissioner of Patents and Trademarks

United States Patent [19]

Chandler

[11] Patent Number: 5,108,127
[45] Date of Patent: Apr. 28, 1992

[54] VEHICLE SUSPENSION SYSTEM

[76] Inventor: Robert B. Chandler, 21 Brookwood, Town & Country, Mo. 63131

[21] Appl. No.: 550,296

[22] Filed: Jul. 9, 1990

[51] Int. Cl.⁵ .............................................. B60G 15/00
[52] U.S. Cl. .................................. 280/675; 280/690; 280/701
[58] Field of Search ................ 180/233; 280/675, 688, 280/690, 701

[56] References Cited

U.S. PATENT DOCUMENTS

| | | | |
|---|---|---|---|
| 3,868,129 | 2/1975 | Grosseau | 280/690 |
| 3,876,029 | 4/1975 | von der Ohe | 280/690 |
| 4,545,602 | 10/1985 | Shibahata | 280/675 |
| 4,566,717 | 1/1986 | Arthur et al. | 280/701 |
| 4,807,902 | 2/1989 | Girodin | 280/701 |
| 4,881,752 | 11/1989 | Tanaka | 280/675 |

FOREIGN PATENT DOCUMENTS 2822058 11/1979 Fed. Rep. of Germany ...... 280/690

*Primary Examiner*—Kenneth R. Rice
*Assistant Examiner*—Tamara L. Finlay
*Attorney, Agent, or Firm*—Polster, Lieder, Woodruff & Lucchesi

[57] ABSTRACT

A vehicle controllable and smooth ride system with sprung weight comparable to or less than the unsprung weight is provided by a cantilevered connection between the front and rear unsprung weight and near horizontal arrangement of suspension devices in the sprung weight of the vehicle so verticle motion of the front and rear unsprung weight is transmitted to the sprung weight while the entire sprung weight is applied to each front and rear unsprung weight motions.

12 Claims, 2 Drawing Sheets